United States Patent [19]
Forbes et al.

[11] Patent Number: 6,039,627
[45] Date of Patent: Mar. 21, 2000

[54] DURABLE AND EASILY OPERATED GAME CALLING DEVICE

[75] Inventors: David R. Forbes, Cedar Rapids; Dave Mortensen, Ely; Ron M Bean, Cedar Rapids; Gregory G. Williams, Iowa City, all of Iowa

[73] Assignee: Hunter's Specialties, Inc., Cedar Rapids, Iowa

[21] Appl. No.: 09/082,198

[22] Filed: May 20, 1998

[51] Int. Cl.[7] .................................................. A63H 5/00
[52] U.S. Cl. .............................................................. 446/208
[58] Field of Search .................................. 446/202, 206, 446/207, 208, 209, 416, 486

[56] References Cited

U.S. PATENT DOCUMENTS

| | | | |
|---|---|---|---|
| 3,579,903 | 5/1971 | Stewart . | |
| 4,940,451 | 7/1990 | Leady | 446/208 |
| 4,950,201 | 8/1990 | Sceery | 446/207 |
| 5,222,903 | 6/1993 | Parrott et al. | 446/208 |
| 5,577,946 | 11/1996 | Oathout | 446/208 |
| 5,643,039 | 7/1997 | McIntyre | 446/208 |
| 5,885,127 | 3/1999 | Colyer | 446/208 |

*Primary Examiner*—Robert A. Hafer
*Assistant Examiner*—Jeffrey D. Carlson
*Attorney, Agent, or Firm*—Simmons, Perrine, Albright & Ellwood PLC

[57] ABSTRACT

A game call having a reed disposed inside of a longitudinal tube wherein the reed is manipulatable by a caller's finger. The caller's finger is in one embodiment depressed through and movable along an opening in the tube. The caller's finger is separated by either an inelastic member disposed on the exterior of the tube or an elastic member disposed within the tube. Or in another embodiment, the reed is encircled by a flexible tube of 360 degrees and the caller's fingers are capable of approaching the reed from any direction. In one embodiment, the caller's fingers are permitted to approach the reed in only a limited fashion through a series of relatively small finger-sized orifices disposed over predetermined points along the reed. In yet another embodiment, the caller's fingers are permitted to actually touch the reed without any flexible tube member or skin disposed between the caller's finger and the reed. Also shown is a call having a plunger and a reed contacting member coupled to it for changing the tone of the call by depressing the plunger. A slide adjusted call is also shown which includes slide coupled to reed contacting member.

1 Claim, 3 Drawing Sheets

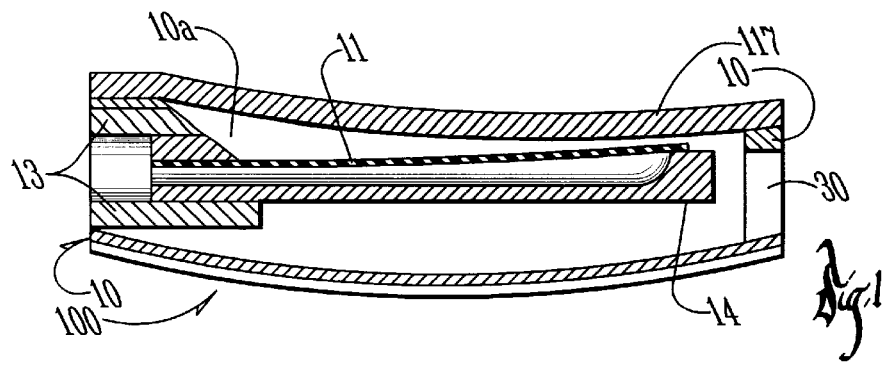
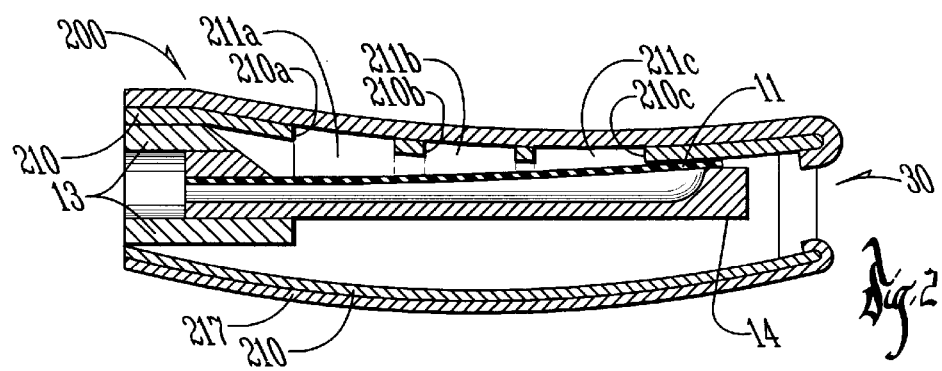
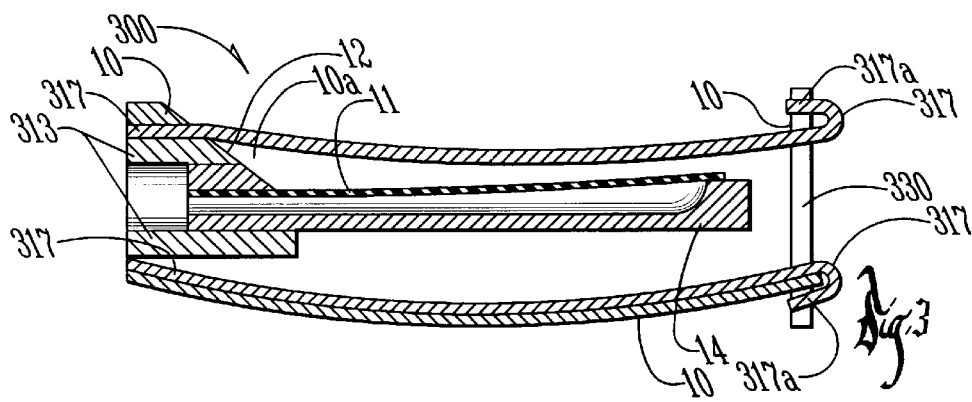
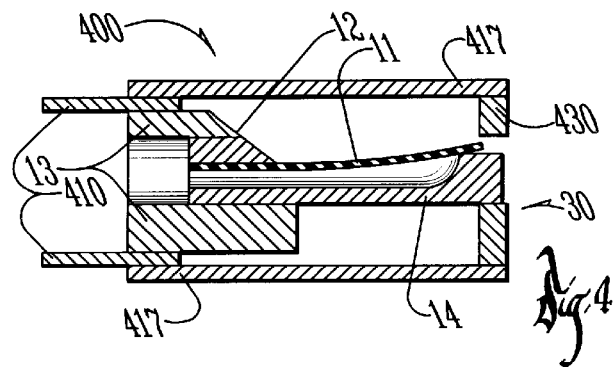

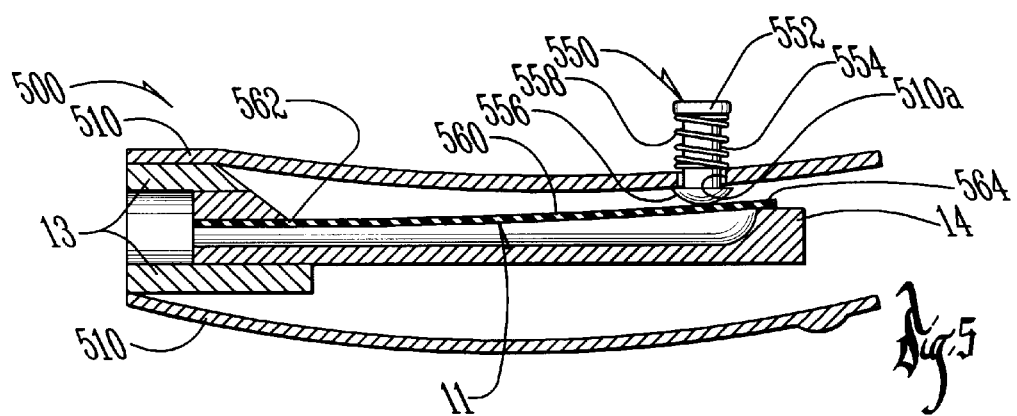
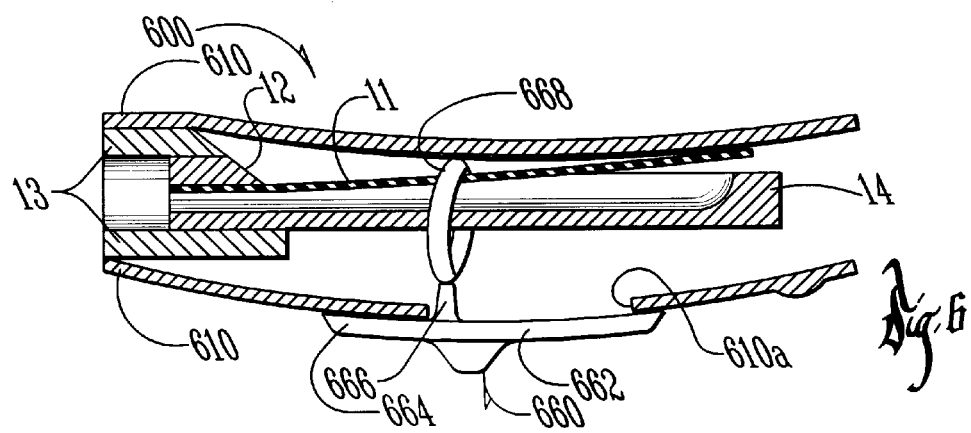

DURABLE AND EASILY OPERATED GAME CALLING DEVICE

FIELD OF THE INVENTION

The present invention generally relates to game calls, and more particularly relates to durable tubular game calls, often called grunt tubes, which have adjustable pitch, intensity, tone and inflection.

BACKGROUND OF THE INVENTION

In the past, hunters often have used many different types of game calls. One type of call which has been used is described in U.S. Pat. No. 5,577,946 entitled "Game Calling Device Having Adjustable Pitch, Intensity, Tone and Inflection" by David E. Oathout, which was filed on Sep. 27, 1995, which patent is hereby incorporated herein in its entirety by this reference. While this call has many positive aspects, it has several drawbacks.

First of all, it contains an elastic skin disposed over a rigid tube. The elastic skin is susceptible to cracking and general degradation when the call is used for several years. Additionally, if the call is used in cold environments, the tendency for the elastic skin to crack is often increased. Secondly, it is often difficult for some novice hunters/callers to master the proper usage of the features of the call which permit adjustable pitch, intensity, tone and inflection.

Consequently, there exists a need for improvement in game calls which overcome the above-stated problems.

SUMMARY OF THE INVENTION

It is an object of the present invention to provide a durable game call.

It is a feature of the present invention to include an inelastic outer skin disposed over an opening in the mouthpiece of the call.

It is an advantage of the present invention to reduce the cracking and skin degradation associated with elastic skins disposed over the mouthpiece opening.

It is another feature of the present invention to provide an elastic skin disposed on the inside of the mouthpiece tube.

It is another advantage of the present invention to reduce the distance and thereby the pressure exerted upon the elastic skin when it is depressed to contact the underlying reed.

It is another object of the present invention to provide a game call which is easy to operate.

It is another feature of the present invention to include a series of openings in the mouthpiece for manipulating the underlying reed.

It is another advantage of the present invention to guide the caller's finger to a predetermined spot along the reed.

It is yet another object of the present invention to have a widely variable and adjustable game call.

It is yet another feature of the present invention to have a flexible mouthpiece disposed about the underlying reed member.

It is yet another advantage of the present invention to allow for contact of the reed by the caller's finger from a wide angle of directions.

The present invention is a method and apparatus for producing sound which is designed to satisfy the aforementioned needs, provide the previously stated objects, include the above-listed features, and achieve the already articulated advantages. In the present invention, the problems associated with the cracking and degradation of the elastic skin have been reduced, and the problems associated with difficulty in operating the call have also been reduced.

Accordingly, the present invention is a method and apparatus for providing a sound of game over a wide tone range which has enhanced durability of the skin disposed about the reed manipulating orifice and further has enhanced configurations for allowing the caller's finger to contact the reed at a predetermined position.

BRIEF DESCRIPTION OF THE DRAWINGS

The invention may be more fully understood by reading the following description of the preferred embodiments of the invention, in conjunction with the appended drawings wherein:

FIG. 1 is a longitudinal cross-sectional view of the mouthpiece portion of the call of the present invention having an inelastic skin disposed over, across and in the reed manipulating orifice.

FIG. 2 is a longitudinal cross-sectional view of an alternate embodiment of the present invention which includes a series of digit-sized reed manipulating orifices disposed along and above the reed.

FIG. 3 is a longitudinal cross-sectional view of an alternate embodiment of the present invention which includes an elastic skin disposed on the inside of the mouthpiece of the present invention.

FIG. 4 is a longitudinal cross-sectional view of another alternate embodiment of the present invention which includes a flexible tube disposed around the reed.

FIG. 5 is a longitudinal cross-sectional view of another embodiment of the present invention which includes a spring-loaded plunger and a tone-changing reed contact member.

FIG. 6 is a longitudinal cross-sectional view of another embodiment of the present invention which includes a sliding member for contacting the reed through an elongated slide orifice.

DETAILED DESCRIPTION OF THE DRAWINGS

Figure 7:
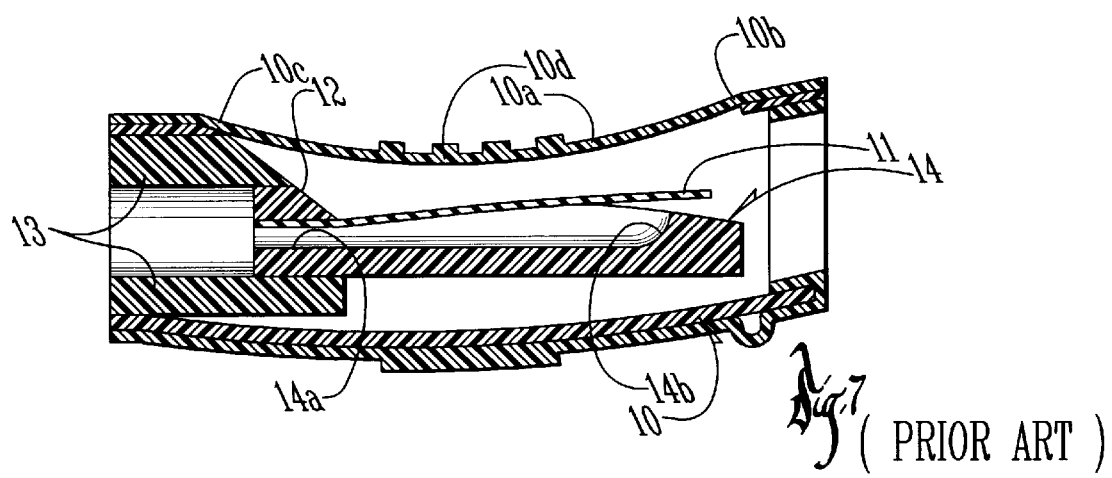
FIG. 7 is a cross-sectional representation of a game call of the prior art.

Now referring to the drawings, wherein like numerals refer to like matter throughout, and more particularly to FIG. 1, there is shown a mouthpiece 10 connectible to a tube (not shown). The mouthpiece of FIG. 1 is substantially identical to the mouthpiece of FIG. 7, which is similar to FIG. 4 of the Oathout patent, excepting that the skin 17 of FIG. 7 is replaced by an inelastic skin 117 which is allowed to hang further into the mouthpiece 10 and may actually contact the reed 11. The game call 100 can be manufactured using many different materials and techniques. It is believed that one skilled in the art when referring to this application and the Oathout patent should be able to make and use the game call of the present invention without undue experimentation.

Game call 100 with its inelastic skin 117 which is allowed to hang further into the reed manipulating orifice 10a is believed to be capable of exhibiting a reduced tendency toward cracking as compared with the elastic skin 17 of FIG. 7. The material for skin 117 is preferably pliable, and relatively inelastic when compared with the skin 17 of FIG. 7. The skin 117 could be made of many different materials, including a non-air permeable cloth.

Now referring to FIG. 2, there is shown an alternate embodiment of the present invention generally designated 200 which includes a mouthpiece 210 having a series of human finger or digit-sized reed manipulating orifices 210a, 210b, and 210c therein for allowing the caller's finger to press the elastic skin 217 through one or more of the series of orifices and contact the reed at a predetermined point. The reed 11 is divided into a series of predetermined regions 211a, 211b, and 211c which are disposed beneath and are operably associated with reed manipulating orifices 210a, 210b, and 210c respectively.

The game call 200 of the present invention permits a less experienced or novice hunter/caller to operate the game call by guiding the caller's fingers to the predetermined reed manipulating orifices. The size of each orifice 210a–210c is preferably small enough that the skin 217 when pressed by the caller's finger through any one of the reed manipulating orifices will contact the reed at only one position along the reed 11. This arrangement allows for the caller to operate the call in a more controlled fashion. The ability to repeat the same or similar sounds from the call is dramatically improved because the variability in placement of the caller's finger is controlled through the use of the series of predetermined reed manipulating orifices. The caller may utilize more than one finger to manipulate more than one reed manipulating orifice, but the caller is unable to manipulate more than one area of the reed through any single reed manipulating orifice 210a–210c. The elastic skin 217 may be the same material as used in 117 in FIG. 1 above or in skin 17 of FIG. 7. However, it is preferred that the skin 217 have more of an elastic nature than either the skin 117 or the skin 17 of FIG. 7. The size of the reed manipulating orifices 210a–210c is smaller than the reed manipulating orifice 10a of FIG. 1, and consequently an enhanced elastic nature may be desirable.

Now referring to FIG. 3, there is shown an alternative embodiment of the present invention generally designated 300 which includes a mouthpiece 10 and an elastic skin 317 disposed on the inside of mouthpiece 10. Elastic skin 317 is preferably thin and capable of spanning the reed manipulating orifice in 10a. Such skin preferably has sufficient elasticity to allow stretching by a caller's finger to contact the reed 11. Note that the distance between the skin 317 and the reed 11 is less than the distance between the skin 217 and the reed 11 of FIG. 2. Skin 317 is shown extending out and around the mouth end 330 of the mouthpiece 10. The elastic skin 317 is preferably attached to the mouth end 330 of the tube 10 by a restraining band 317a which is preferably an elastic band capable of firmly grasping elastic skin 317. Band 317a may also be a more rigid band made of different material such as metal or plastic; e.g. a hose clamp or the like. Also, reed support member 313 is slightly smaller than reed support member 13 of FIG. 7 to accommodate for skin 317.

Now referring to FIG. 4, there is shown yet another alternate embodiment of the present invention generally designated 400 having a flexible tube member 417 extending around the reed 11. A tube member 410 is used to receive the reed support member 13; however, tube member 410 does not extend along the length of the entire reed 11. Instead, flexible tube member 417 is placed over the tube member 410 and flexible tube member 417 extends the entire length of the reed. Preferably, flexible tube member 417 is a tube with sufficient elasticity that the caller can squeeze the tube member 417 and thereby contact the reed 11. Also shown in FIG. 4 is a mouth end ring 430 which is disposed at the mouth end 30 of flexible tube 417. The mouth end ring 430 is preferably rigid and is coupled to plate 14 so as to provide support to the mouth end 30 of the call 400. It is understood that the mouth end ring 430 is an optional device and is not essential to the operation of the call 400. Mouth end ring 430 could be coupled to plate 14 along the bottom side and thereby may provide desirable rigidity to the mouth end 30 for some callers. The elasticity of flexible tube 417 is preferably less than the elasticity of skin 317, skin 217 and skin 17 of FIG. 7. The flexible member 417 may be made of a rubber or plastic hose material.

In operation, game call sounds are generated using the following methods. Referring to FIG. 2, the caller grasps the call 200 and blows in the mouth end 30 causing air to pass over the reed 11. Then at least one of the caller's fingers is used to depress the skin 217 through at least one of the reed manipulating orifices 210a–210c. The caller is able to manipulate the sound of the call 200 by contacting the reed at any portion 211a–211c of the reed 11 or any combination of these portions. Another method of operating the game call of the present invention is more easily understood when referring to FIG. 4. The caller blows into the mouth end 30 of call 400 causing air to vibrate the reed 11. The caller preferably firmly grasps the tube 410 and uses a less firm grasp to manipulate the flexible tube member 417 to contact the reed 11. The direction of the manipulation of the flexible tube member 417 is permitted over a much wider range than in calls 300 and 100. In fact the flexible tube member 417 can be caused to move toward the reed 11 in two different and opposing directions simultaneously. This manipulation of the flexible tube member 417 in and around the reed 11 provides for a widely varying possibility of sound output of the call 400. It is believed that the call 400 may be more difficult to master than the use of the calls 100, 200 and 300; however, the additional variability of tone, pitch, etc. may be preferred to some experienced callers.

Now referring to FIG. 5, there is shown an alternate embodiment of the present invention generally designated 500. An external barrel 510 is shown having an orifice 510a therethrough. Extending through orifice 510a is probe generally designated 550 having a shaft 554 having a probe handle 552 and a probe contact head 556 disposed on opposite ends thereof. Preferably, probe 550 is spring biased with spring 558. Probe contact head 556 is shown contacting tone-changing reed contact member 560 which is preferably a semi-resilient reed like member having a proximal end 562 and a distal end 564. In operation, when probe 550 is depressed, contact head 556 contacts with reed contact member 560, causing reed contact member to move toward reed 11. A point of contact between reed contact member 560 and reed 11 moves distally from a proximal point as probe 550 is depressed further through orifice 510a and reed contact member 560 is increasingly deflected. This changes the effective length of free vibration of the reed 11 and thereby changes the tone of the call. Probe 550 may be made of material similar to barrel 510, such as poly vinyl chloride (PVC) or any other suitable material that provides acceptable performance characteristics.

Now referring to FIG. 6, there is shown an alternate embodiment of the present invention generally designated 600 having a barrel 610 with a slide orifice 610a therethrough. Extending through slide orifice 610a is slide 660 having a distal orifice cover 662 and a proximal orifice cover 664. Slide 660 is shown having a shaft 666 and a reed contact ring 668 extending over and contacting reed 11. Reed contact ring 668 is caused to slidingly contact reed 11. This changes the effective length of free vibration of the reed 11 and thereby changes the tone of the call. Slide 660 may be constructed of PVC or any other suitable material that provides acceptable performance characteristics.

Now referring to FIG. 7, there is shown a game call of the prior art, including a mouthpiece 10 which is substantially a cylindrically shaped tube formed of plastic that includes an opening 10a. The opening 10a extends axially, widening from either end 10b, 10c to a middle portion 10d. An axial cross-section of the mouthpiece 10 is shown in FIG. 7. The reed 11 is disposed within the mouthpiece 10 in alignment with the opening 10a. The reed is a thin strip of a flexible material such as plastic or Mylar as is well known in the art. The dimensions of the reed and the material of which it is made are determined according to the sound characteristics that the user desires to produce with the game call. The reed 11 is supported by a plate 14, and reed 11 and plate 14 are secured to a reed support member 13 by a wedge 12. The plate 14 has a substantially semi-circular cross-section. An upper side of the plate 14 is flat and includes a groove 14a through which air is conveyed by the user. The groove 14a extends from a front (i.e. downstream) surface of the plate 14 and terminates at a groove end wall 14b near a rearward (i.e. upstream) portion of the plate 14.

It is thought that the method and apparatus of the present invention will be understood from the foregoing description and that it will be understood from the foregoing description that it will be apparent that various changes may be made in the form, construction, steps and arrangement of the parts and steps thereof without departing from the spirit and scope of the invention or sacrificing all of their material advantages. The form herein described being merely a preferred or exemplary embodiment thereof.

We claim:

1. A grunt tube comprising:

a tubular member defining an axial direction and having a mouthpiece end that allows air to enter said tubular member, an outlet end that emits sound and an opening in a wall of said tubular member between said mouthpiece end and said outlet end;

a reed that vibrates in response to passing air, said reed being disposed within said opening and having portions along the axial direction simultaneously accessible through said opening;

an elastic skin disposed on the inside of said wall of said tubular member to at least partially cover said opening, the elastic skin being resilient to allow selective application of pressure through the elastic skin to at least one of the simultaneously accessible portions on said reed, wherein a user can modify sounds emanating from said outlet end produced by air passing through said mouthpiece end and past said reed by selectively applying pressure to said elastic skin.

* * * * *